Aug. 6, 1963 D. W. BYRNES 3,099,979

WATER TROUGH AND CLEANING MEANS

Original Filed Jan. 30, 1958

INVENTOR

DENNIS W. BYRNES

BY Dean Laurence

ATTORNEY

United States Patent Office 3,099,979

Patented Aug. 6, 1963

3,099,979

WATER TROUGH AND CLEANING MEANS

Dennis W. Byrnes, 4565 S. 6th St., Tucson, Ariz.

Original application Jan. 30, 1958, Ser. No. 712,118, now Patent No. 3,045,612, dated July 24, 1962. Divided and this application Sept. 27, 1961, Ser. No. 146,679
8 Claims. (Cl. 119—22)

The present invention relates to animal husbandry, and more particularly relates to a water trough and cleaning means for use in an animal husbandry apparatus. In my U.S. patent application Serial No. 712,118, filed January 30, 1958, entitled Animal Husbandry, now U.S. Patent 3,045,612 dated July 24, 1962, and of which this application is a division, I disclosed an animal husbandry system for feeding and watering laying hens and for collecting and counting eggs.

In an animal husbandry system such as that described in my U.S. Patent 3,045,612, it is important that the watering troughs used therein remain clean and free of feed and other refuse and, accordingly, it is an object of this invention to provide an animal husbandry system including a plurality of cages having water troughs thereon movable in an endless path and a water trough cleaning station mounted adjacent the endless path.

Further objects and advantages of the invention will be apparent upon reference to the following specification and drawings, wherein.

Figure 1:
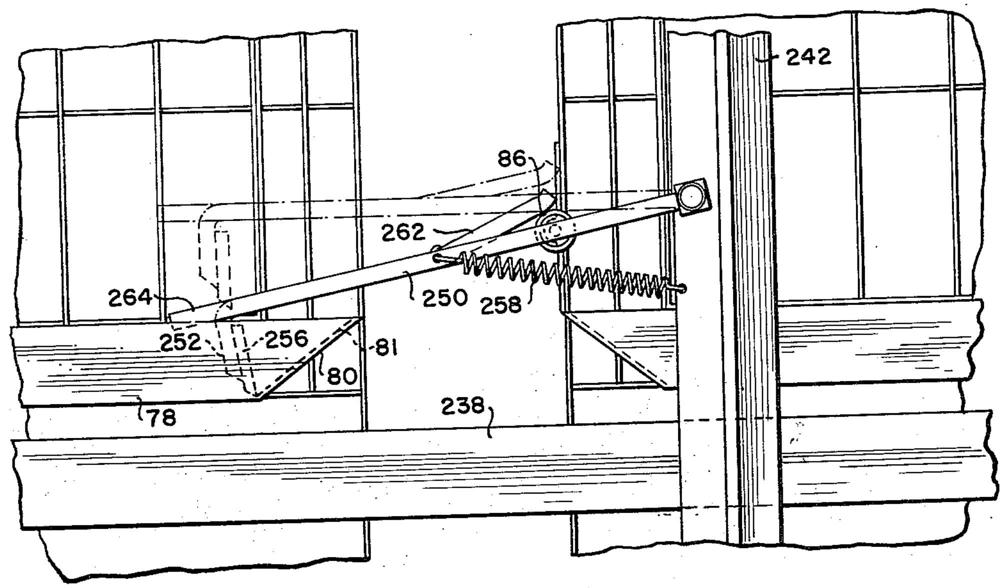
FIGURE 1 is a vertical fragmentary longitudinal view of my water trough cleaning and draining device.
Figure 2:
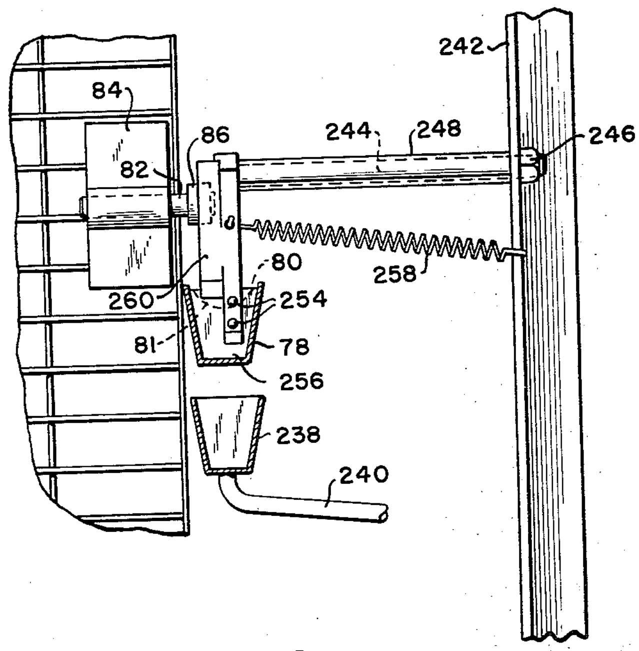
FIGURE 2 is a transverse fragmentary vertical view of the water trough cleaning and draining device illustrated in FIGURE 1.

Referring now to the drawing, a water trough and cleaning means in accordance with the principles of my invention includes water troughs 78 secured as by welding to the sides of cage groups 50. The troughs have end plates 80 extending diagonally upwardly. The upper edges of the end plates 80 have arcuate indentations 81 formed therein to permit removal of water and other material from the water troughs by means later described. To control the movement of this later described means for cleaning the water troughs, each cage group 50 has an axle 82 secured thereto by a plate 84. A roller 86 is rotatably mounted on axle 82.

Drain troughs 238 extend between suitable vertical supports, not shown and a stanchion 182 at levels to receive water and other material scraped from the water troughs 78. Each drain trough 238 has a conduit 240 extending from the bottom thereof to a sewer (not shown), as seen in FIGURE 8. Referring to FIGURE 1, a rigid standard 242 extends vertically adjacent drain troughs 238. A bar 244 has its threaded end extending through an aperture in standard 242 and secured in position by a nut 246. A hollow tube 248 fits around bar 244 and freely rotates thereon. A water trough scraper arm 250 is rigidly secured to the end of hollow tube 248 and extends perpendicularly thereto. The outer end of arm 250 is bent downwardly at 252 and secured by rivets 254 to a rubber scraper 256 having an outer shape mating the inside of each water trough 78 to form a tight engagement therewith. A tension spring 258 extends from arm 250 to standard 242 and urges the rubber scraper 256 downwardly into scraping engagement with the inside of each water trough 78.

To lift the scraper 256 out of each water trough at the end of the water trough and hold the scraper up until the next water trough has reached position below the scraper, a guide 260 is integrally secured to the scraper arm 250 and is positioned to engage roller 86 mounted on each cage group 50. The guide 260 includes an upturned portion 262 and a straight portion 264 extending for a distance beyond the scraper 256.

*Description of Operation*

As each cage assembly 12 approaches the water trough cleaning station 24, the roller lifter 86 engages upturned portion 262 of guide 260 and lifts the scraper 256 out of the preceding water trough 78. When the straight portion 264 of the guide 260 rolls off the roller 86, the next water trough 78 is beneath scraper 256. At this time, the spring 258 pulls the scraper downwardly into tight scraping engagement with the bottom and sides of the water trough 78. As the scraper moves relatively down the length of the water trough 78, the water and other material drain out of the arcuate indentation 81 in the end plate 80 and down into the drain trough 238 from which it moves through conduit 240 to a sewer.

The invention may be embodied in other specific forms without departing from the spirit or essential characteristics thereof. The present embodiments are therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for animal husbandry comprising: an endless conveyor; a plurality of horizontally-spaced animal cages carried by said endless conveyor in an endless path, each said cage having a water trough mounted on a side thereof, said water troughs being mounted at about the same vertical level; a water trough scraper mounting positioned stationarily adjacent said endless path; a water trough scraper movably mounted on said scraper mounting; means resiliently urging said water trough scraper downwardly to a position occupied by the bottom of said water troughs as said water troughs are carried past said water trough scraper; a lifter mounted on the leading portion of each cage for engaging and lifting said water trough scraper from the preceding trough and maintaining the scraper raised until the next water trough is beneath said scraper.

2. Apparatus for animal husbandry as set forth in claim 1 including a drain trough mounted beneath said water trough scraper for receiving the material scraped from said water trough, a conduit leading from said drain trough for the removal of material therefrom.

3. Apparatus for animal husbandry comprising: an endless conveyor; a plurality of horizontally-spaced animal cages carried by said endless conveyor in an endless path, each said cage having a substantially horizontal water trough mounted on a side thereof, and said water troughs being mounted at about the same vertical level; a stationary mounting adjacent said endless path; a water trough scraper arm pivotally mounted on said stationary mounting and extending downwardly to a position above the position occupied by said water troughs as they are moved in said endless path; a water trough scraper secured to the end of the said scraper arm; a spring resiliently urging said scraper downwardly to a position occupied by the bottom of the water troughs as they move in said endless path; a lifter mounted on the leading portion of each cage for engaging said downwardly extending scraper arm and raising said scraper from the preceding trough and maintaining said scraper raised until the next water trough is beneath said scraper.

4. Apparatus for cleaning horizontally disposed water troughs secured to the sides of moving and horizontally spaced animal cages comprising: a pivotably mounted arm supported adjacent the path of movement of said cages, said arm extending in the direction of movement of and above said water troughs; a scraper blade secured to an end of said arm, said scraper blade being received in said water trough; spring means secured to said arm for urging said scraper blade into said water trough; a roller secured to the leading edge of each of said cages above said water troughs secured thereto; and lifter means secured to said arm for momentarily engaging said roller on each of said cages in succession to raise said scraper blade from the water trough of the preceding cage until the water trough of the following cage is positioned beneath said scraper blade at which time said lifter means disengages said roller and said spring means urges said scraper blade in the water trough thereunder.

5. Apparatus as defined in claim 4 wherein said lifter means comprises a guide having a curved portion and a straight portion secured to said arm, said roller initially engaging said curved portion to lift said scraper blade from said water trough of said preceding cage to a raised position, and said roller engaging said straight portion to maintain said arm in said raised position until the water trough of the following cage is beneath said scraper blade at which time said roller disengages said guide and said spring means urges said scraper blade into the water trough therebeneath.

6. Apparatus as defined in claim 4 wherein the upper edges of the ends of said water troughs have arcuate indentations formed therein facilitating the removal of water and other material from said water troughs.

7. Apparatus as defined in claim 4 including a drain positioned below said scraper blade for catching and removing the water and other material removed from said water troughs.

8. In an animal husbandry apparatus including means for advancing a plurality of horizontally spaced animal cages having water troughs attached thereto in an endless path, the combination comprising water trough scraper means positioned adjacent said endless path; resilient means normally urging said water trough scraper means into one of said moving water troughs as said water troughs are advanced relative to said water trough scraper means; and means attached to the leading portion of each of said advancing cages for engaging and lifting said water trough scraper means from the preceding water trough and for lowering said water trough scraper means into said water trough of the next following cage.

References Cited in the file of this patent

UNITED STATES PATENTS

| | | |
|---|---|---|
| 2,257,734 | Cornell | Oct. 7, 1941 |
| 2,960,965 | Cordis | Nov. 22, 1960 |
| 2,966,884 | Naraghi | Jan. 3, 1961 |